H. A. DIETZEL.
Grain-Binders.

No. 151,105.

4 Sheets--Sheet 1.

Patented May 19, 1874.

Witnesses:
Ernst Bilhuber
Henry Lintner

Inventor:
Henry A. Dietzel
pr
Van Santvoord & Hauff
attys

H. A. DIETZEL.
Grain-Binders.

No. 151,105.

4 Sheets--Sheet 3.

Patented May 19, 1874.

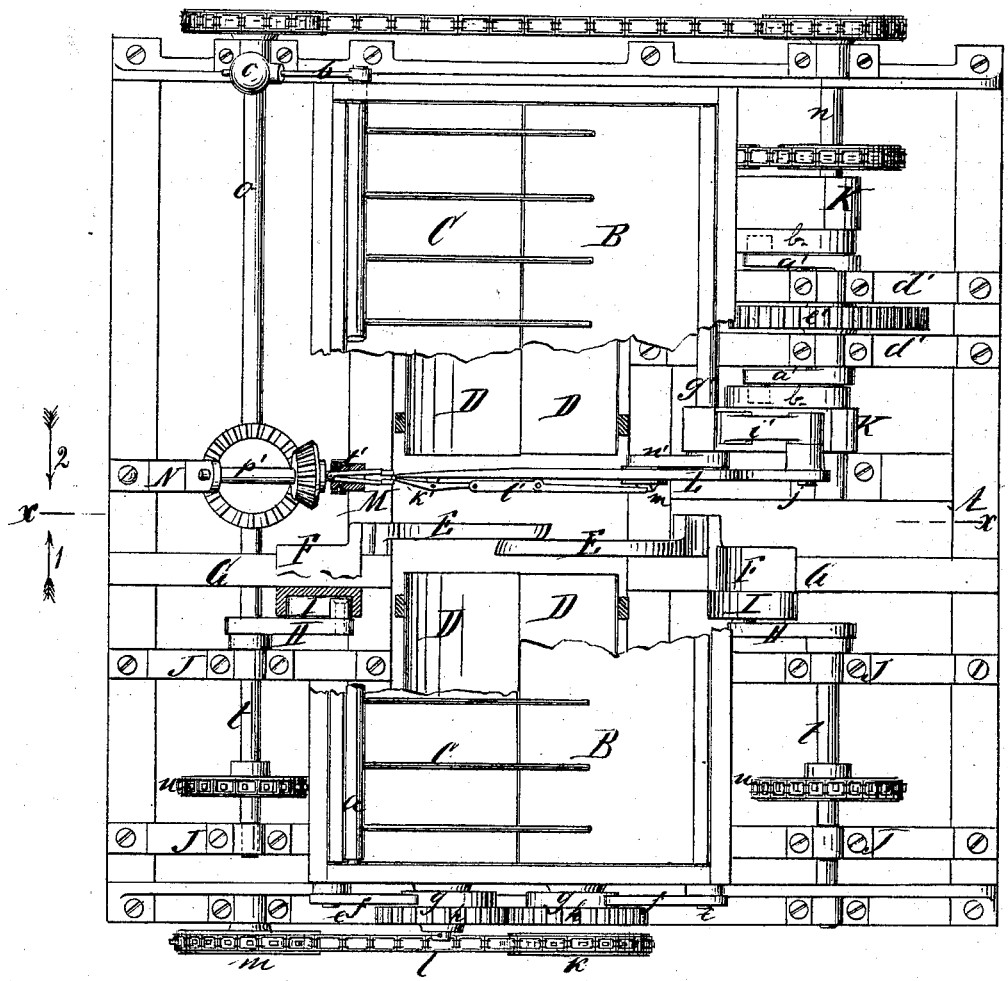

UNITED STATES PATENT OFFICE.

HENRY A. DIETZEL, OF CARLYLE, ILLINOIS.

IMPROVEMENT IN GRAIN-BINDERS.

Specification forming part of Letters Patent No. 151,105, dated May 19, 1874; application filed January 16, 1874.

*To all whom it may concern:*

Be it known that I, HENRY A. DIETZEL, of Carlyle, in the county of Clinton and State of Illinois, have invented a new and useful Improvement in Grain-Binders; and I do hereby declare the following to be a full, clear, and exact description thereof, which will enable those skilled in the art to make and use the same, reference being had to the accompanying drawing, forming part of this specification, in which drawing—

Figure 1:
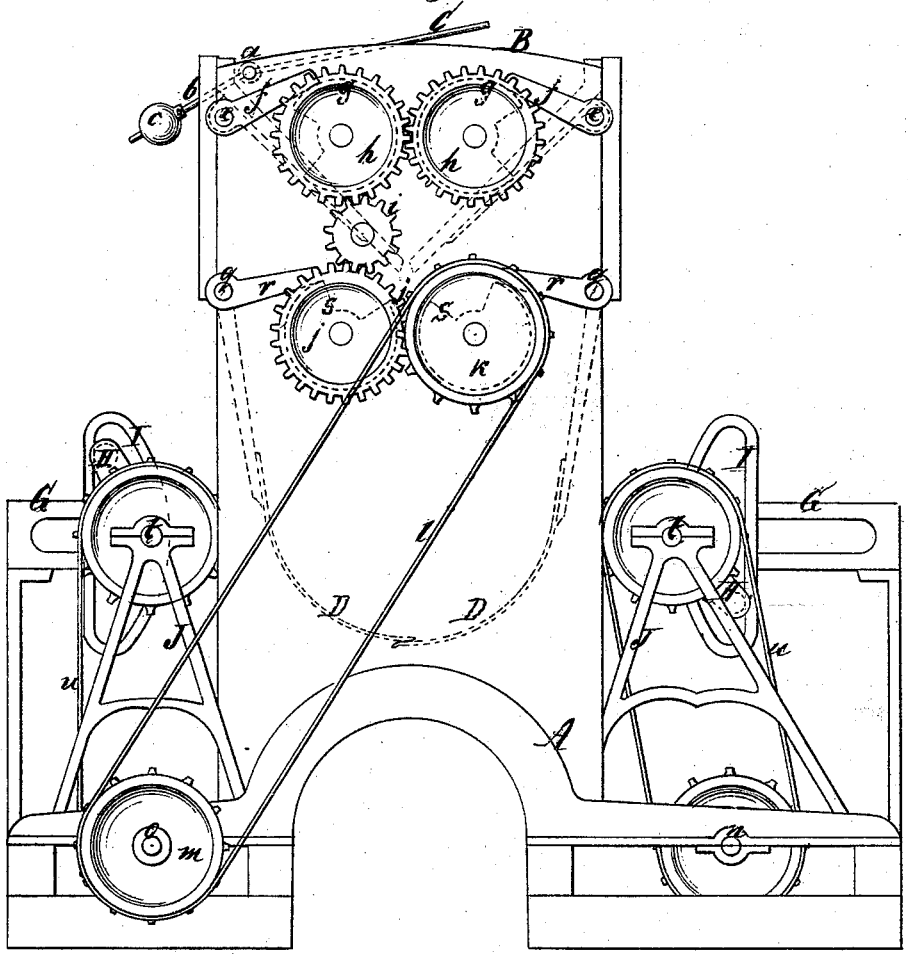
Figure 2:
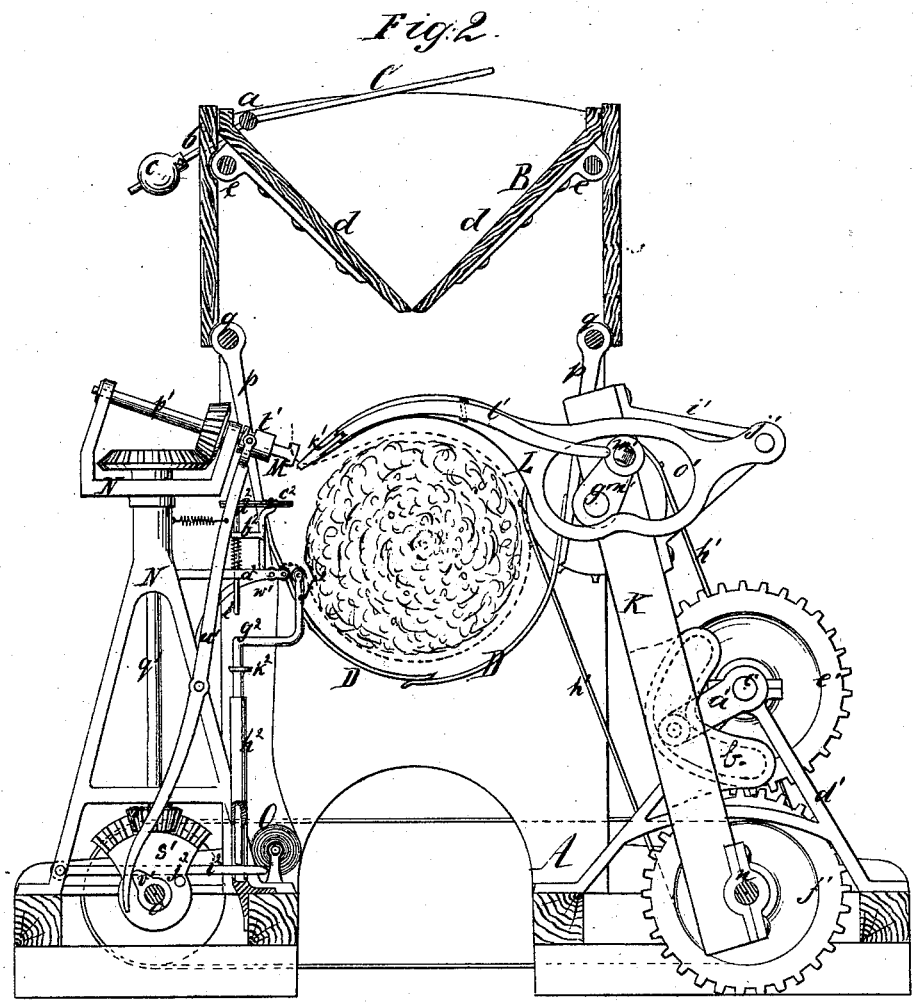
Figure 3:
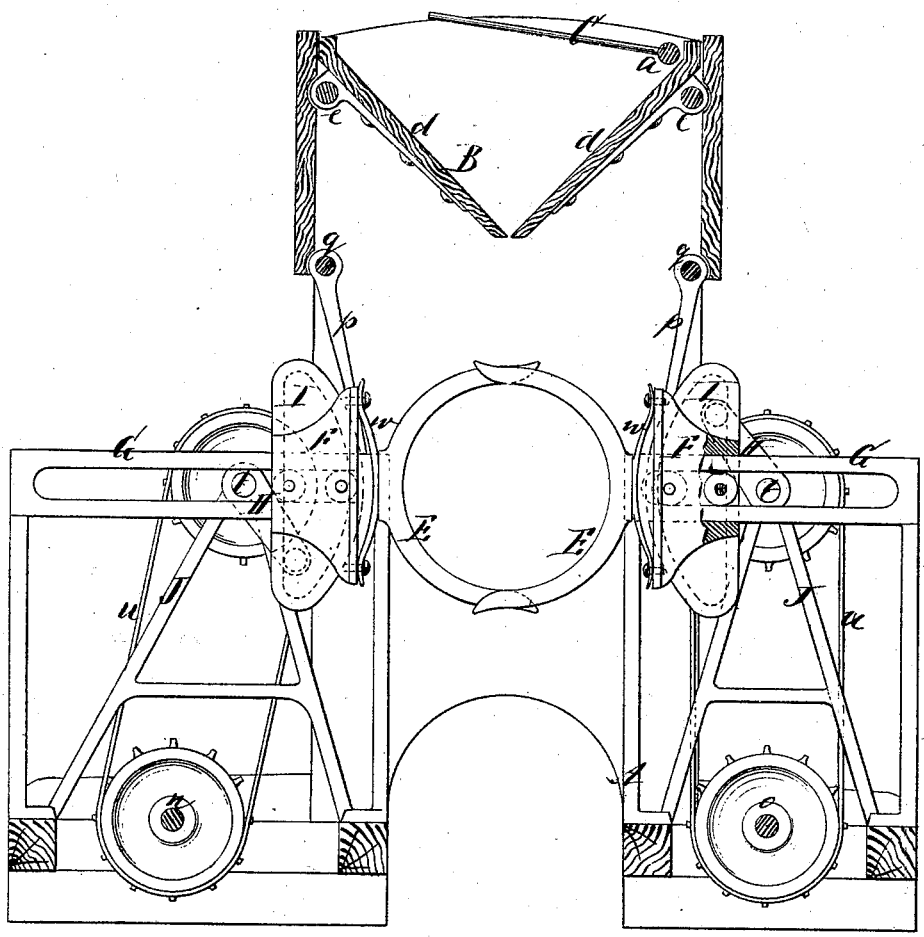

Figure 1 represents an end view of this invention. Fig. 2 is a transverse section of the same, taken in the plane $x$ $x$, Fig. 4, and looking in the direction of the arrow 1 opposite to that line. Fig. 3 is a similar section, taken in the same plane looking in the direction of arrow 2 opposite to that line. Fig. 4 is a sectional plan or top view of the same.

Similar letters indicate corresponding parts.

This invention relates to a grain-binder, in which the grain, as the same is cut by a reaping-machine, is deposited upon a gravitating rake or platform, which serves to measure the grain.

If a quantity of grain sufficient for a sheaf has been deposited on the gravitating-rake, this rake tilts, and the grain is received in a hopper, the sides of which are thrown open at stated intervals, so as to dump the grain in the shaping apparatus. The shaping apparatus is composed of hinged flaps, as hereinafter described.

With the measuring apparatus and the shaping apparatus is combined a binding mechanism of peculiar construction, as will be hereinafter more fully described.

In the drawing, the letter A designates a frame, of wood or any other suitable material, which supports a hopper, B, and a gravitating rake or platform, C. This rake swings on a rock-shaft, $a$, which has its bearings in the ends of the hopper, and from which extends an arm, $b$, carrying a weight, $c$, which has a tendency to retain the rake in the position shown in Figs. 1, 2, and 3.

The frame A is intended to be connected with a reaping-machine in such a manner that the grain, as the same is cut, drops upon the rake or platform C, and the balance-weight of this rake is so adjusted that when a quantity of grain sufficient for a sheaf has accumulated on said rake, the weight of the grain will overbalance the balance-weight $c$, causing the rake to turn down, so that the grain previously deposited thereon will slide down into the hopper B.

By the combination of the gravitating-rake with the hopper the grain is measured, and as the grain is deposited in the hopper, such of the grains which have been thrown on the rake in slightly-oblique positions will arrange themselves in the proper position for the shaping and binding mechanism. As soon as the grain has dropped from the rake, the latter rises so as to receive the grain which is cut while the hopper is open.

The slides $d$ $d$ of the hopper B are suspended from rock-shafts $e$ $e$, which have their bearings in the ends of the hopper, and on the outer ends of these rock-shafts are mounted levers $f f$, which bear on cams $g$ $g$, secured to the inner sides of cog-wheels $h$ $h$, Fig. 1, so that when these cog-wheels revolve, the sides of the hopper are retained in a closed position until the levers $f$ $f$ are released by the cams $g$ $g$, when the sides of the hopper swing open by their inherent gravity, so as to dump the grain and to deliver the same to the shaping mechanism. The cog-wheels $h$ $h$ revolve on studs secured in the end of the hopper, and they mesh into each other, so that they revolve in opposite directions. They receive their motion by a pinion, $i$, which is geared together by cog-wheels $j$ $j$ with a chain-wheel, $k$, that connects by a chain, $l$, with another chain-wheel, $m$, mounted on the driving-shaft $o$. The shaping mechanism consists of two pairs of curved flaps, D D. The flaps D D are secured to arms $p$ $p$, which extend from rock-shafts $q$ $q$ extending through the sides of the frame A beneath the hopper B. On said rock-shaft are mounted levers $r$ $r$, Fig. 1, which bear upon cams $s$ $s$ secured to the inner sides of the cog-wheels $j$ $j$. By the action of these cams the flaps D D are retained in a closed position (see Fig. 2) during the largest portion of the revolution of the cog-wheels $j$ $j$; but when the levers $r$ $r$ are released by said cams the flaps D D open by their own gravity, and the sheaf which in the meantime has been securely bound is dumped on the ground. The compressing-jaws E E are secured to carriages F F, Fig. 3, which receive a reciprocating motion in guides G G by means of cranks H H which act on cams I I secured to said carriages, so that the motion of the compressing-jaws takes place at the proper time. The cranks H H are mounted on the ends of shafts $t\ t$ which have their bearings in standards J J, and which receive the required motion by chains $u\ u$. The connection between the compressing-jaws and their carriages is effected by means of springs $w\ w$, Fig. 3, so that if the quantity of grain delivered to the shaping mechanism should be too large, the jaws E E can yield, and injury to the mechanism is prevented. On the shaft $n$ is mounted a swinging frame, K, to which an oscillating motion is imparted by means of cranks $a^1$ which act on cams $b^1$ secured to said frame. The cranks $a^1$ are mounted on a shaft, $c^1$, which has its bearings in standards $d^1$, and which is geared, together with the shaft $n$, by cog-wheels $e^1\ f^1$, Fig. 2. In the upper part of the swinging frame K is mounted a shaft, $g^1$, which connects with the shaft $n$ by a chain, $h^1$, running over suitable chain-wheels, so that a continuous revolving motion can be imparted to the shaft $g^1$ independent of the swinging motion of the frame K. On this frame is secured a standard or bracket, $i^1$, which forms the bearing for a pivot, $j^1$, supporting an arm, L, that forms the principal portion of the wire-carrying clamp. To the front end of the arm L is pivoted a jaw, $k^1$, which is held closed by the action of a spring, and which is thrown open at the proper intervals by a lever, $l'$, and a cam, $m'$, Figs. 2 and 4. The arm L receives an oscillating motion on its pivot $j^1$ by means of a crank, $n'$, which is mounted on the shaft $g^1$ and engages with a cam-slot, $o^1$, formed in the body of the arm L. As the shaft $n$ revolves the frame K is caused to oscillate, and, at the same time, the arm L is made to swing on its pivot $j^1$, so that it is enabled to carry the binding-wire down and through between the shaping-flaps D D, and then up and back above the sheaf contained in the compressing-jaws to the twisting and cutting mechanism. As the arm L moves forward toward the twisting and cutting mechanism, the jaw $k^1$ on said arm is opened by its cam $m'$ and then allowed to close on the strand of wire held in readiness, and then the wire is carried down and through between the shaping-flaps D D and up over the sheaf to the twisting-nippers M. These nippers are mounted on the end of a shaft, $p'$, which has its bearings in a standard, N, Fig. 2, and is geared together with a vertical shaft, $q'$, on the lower end of which is mounted a pinion, $r'$, that meshes into a toothed segment, $s'$, fastened on the driving-shaft $o$. The jaws of said nippers are pressed open by a spring placed between them and on the shank of said nippers is fitted a sleeve, $t'$, with an annular groove to receive the forked end of a lever, $u'$, to which an oscillating motion is imparted by a cam, $v'$, secured on the shaft $o$. The binding-wire is taken from a spool, O, secured to the frame A in any convenient position, and it passes up through guide-rollers $w'$ secured in a bracket, $a^2$, which is fastened to the standard N. From this bracket rises a standard, $b^2$, which supports the shears $c^2$. The handles of these shears pass through a triangular eye, $d^2$, Fig. 2*, which is secured to the end of a vertical rod, $e^2$, that is depressed by the action of a spring. If this rod is raised the triangular eye closes the shears. Beyond the guide-rollers $w'$ is a lifting-roller, $f^2$, which is mounted in the upper end of a rod, $g^2$, that is fitted into a tubular socket, $h^2$, secured to the standard N. The lower end of this rod rests upon a lever, $i^2$, which is raised at fixed intervals by an eccentric pin, $j^2$, secured in a disk, which is mounted on the shaft $o$. From the lifting-rod $g^2$ projects a tappet, $k^2$, and if said rod is raised by the action of the lever $i^2$, this tappet strikes the rod $e^2$ of the closing eye $d^2$, and the shears are closed. The end of the wire is drawn up between the guide-rollers $w'$ and placed between the jaws of the clamping-arm L, and, by the action of this clamping-arm, the wire is carried round, so that it occupies the position shown in dotted lines in Fig. 2, its end being placed between the twisting-nippers M. Before the clamping-arm brings the wire into this position, however, a quantity of grain has been deposited in the shaping-flaps, so that the wire is, in reality, carried round the grain. When the clamping-arm L has reached the position shown in Fig. 2, the lifting-roller $f^2$ is raised, and the wire from the spool O is carried up between the jaws of the twisting-nippers, and at the same time that portion of the wire which embraces the sheaf is drawn up tight, and as the tappet $k^2$ strikes the rod $e^2$ of the closing-eye $d^2$ the wire is cut by the action of the shears, and then the twisting-nippers are closed upon the two ends of the wire, and at the same time said nippers receive a rapid revolving motion, so that the two ends of the wire are twisted together, and the sheaf contained between the compressing-jaws and shaping-flaps is thereby firmly bound. As soon as this has been accomplished the revolution of the twisting-nippers stops, their jaws open, and the sheaf, being released by the compressing-jaws and shaping-flaps, is dropped to the ground.

In order to retain the twisting-nippers in the proper position for the reception of the ends of the binding-wire, after their revolution has been stopped, they will be provided with a balance weight or spring of such a nature that they will be compelled to stop in the desired position.

What I claim as new, and desire to secure by Letters Patent, is—

1. In combination with the gravitating platform C and hopper B, the suspended folding sides $d\ d$, which open and close at stated intervals to dump the grain previously gathered to the shaping mechanism D D, substantially as described.

2. The combination of hinged curved flaps

D D, which act on the ends of the grain, with the compressing-jaws E E, which grasp the grain near the middle of its length to compress it preparatory to binding, substantially as set forth.

3. The carriages F F, carrying the compressing-jaws E E, and adapted to receive a rectilinear reciprocating motion in the guides G G, in the manner and for the purpose specified.

4. The oscillating frame K, containing a revolving shaft, $g^1$, and crank $n'$, in combination with the wire-carrying arm L, pivoted to said frame, and receiving an oscillating motion by the crank $n'$, thereby imparting to said arm L a compound motion, substantially as shown and described.

5. The combination of the wire-carrying arm L with the shaping-flaps D D, compressing-jaws E E, twisting-nippers M, and lifting-rod $g^2$ and shears $c^2$, the lifting-rod serving to tighten the wire round the sheaf, and to carry its end between the shears, substantially as set forth.

6. The closing eye $d^2$, actuated by the tappet $k^2$ on the lifting-rod $g^2$, in combination with the shears $c^2$, and with the binding mechanism, constructed and operating substantially as described.

7. The sleeve $t'$ and forked lever $w'$ in combination with the nippers M, which receive a revolving motion at the proper intervals, said sleeve serving to keep the nippers closed during the time when they revolve, substantially as set forth.

This specification signed by me this 8th day of January, 1874.

HENRY A. DIETZEL.

Witnesses:
W. HAUFF,
E. F. KASTENHUBER.